W. C. CAMPBELL.
MILK BOTTLE CARRIER.
APPLICATION FILED APR. 24, 1919.
1,352,173.  Patented Sept. 7, 1920.
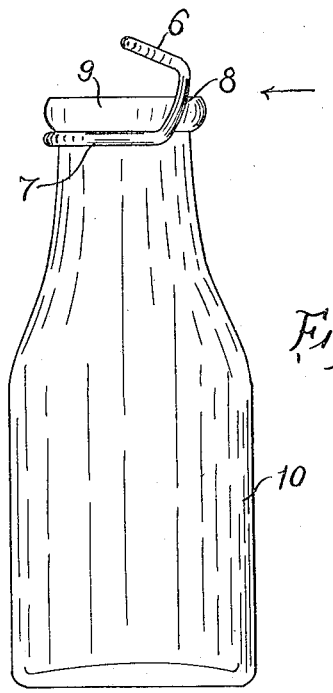
Fig. 1.
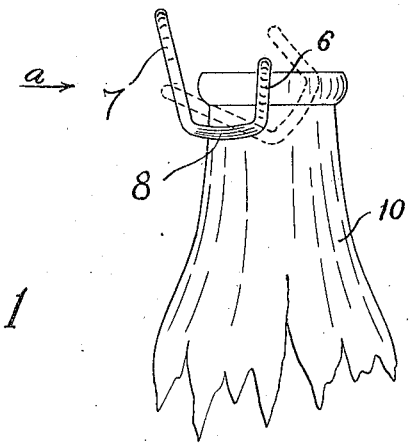
Fig. 2.
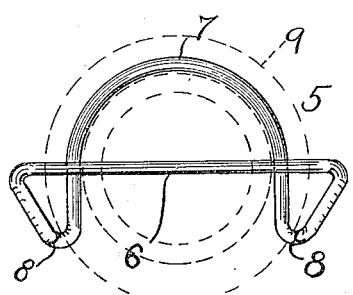
Fig. 4.
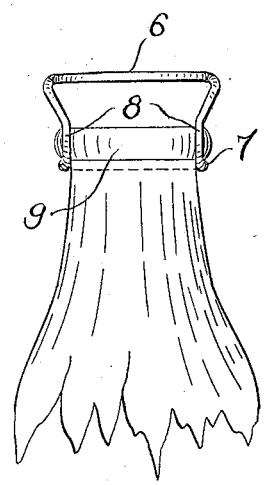
Fig. 3.
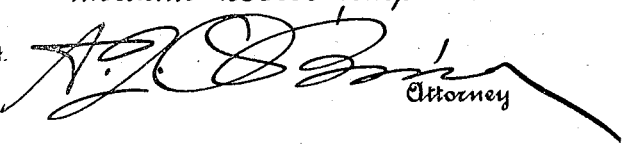
Inventor
William Chester Campbell.
By
Attorney

UNITED STATES PATENT OFFICE.

WILLIAM CHESTER CAMPBELL, OF DENVER, COLORADO.

MILK-BOTTLE CARRIER.

1,352,173.  Specification of Letters Patent.  Patented Sept. 7, 1920.

Application filed April 24, 1919. Serial No. 292,232.

*To all whom it may concern:*

Be it known that I, WILLIAM CHESTER CAMPBELL, a citizen of the United States, residing at the city and county of Denver and State of Colorado, have invented certain new and useful Improvements in Milk-Bottle Carriers; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in milk bottle carriers, my object being to provide a device which is adapted to be readily applied to and removed from the neck of a milk bottle or similar receptacle, the device at the same time having a handle member projecting sufficiently above the top for the purpose.

My further object is to provide a device of this character which shall be exceedingly simple in construction, economical in cost, reliable, durable, and efficient in use.

Briefly expressed, the device consists of a closed loop, preferably composed of wire, the loop being larger at one end than at the other, the two ends being bent toward each other, the opening in the larger end of the loop being large enough to allow the top of the milk bottle to pass through, while the opening in the smaller end is too contracted for such passage, but large enough to receive the neck just below the top of the bottle, the opening in the part between the bent ends being also large enough to receive the neck just below the top of the bottle, but of less width than the outside diameter of the top.

Having briefly outlined the invention, as well as the function it is intended to subserve, I will proceed to describe the same in detail, reference being made to the accompanying drawing, in which is illustrated an embodiment thereof. In this drawing:

Figure 1 is an elevation of a milk bottle, showing my improved carrier applied and in position for use.

Fig. 2 is a fragmentary view of the bottle, showing the article in two positions—one in full lines and the other in dotted lines.

Fig. 3 is a fragmentary view of a bottle with the carrier applied and looking in the direction of arrow 3, Fig. 1.

Fig. 4 is a detail view of the device shown on a larger scale.

The same reference characters indicate the same parts in all the views.

Let the numeral 5 designate my improved milk bottle carrier considered in its entirety and composed of a loop, preferably formed of wire, and whose extremities 6 and 7 are bent toward each other and approximately at right angles to the intermediate part 8 of the device. The extremity 6 of the loop has a relatively wide opening, its width being at least equal to the outside diameter of the top 9 of the bottle 10, while the portion 7 of the loop is of less width than the outside diameter of the top of the bottle, but is sufficiently wide to receive the bottle neck immediately below the top 9. Furthermore, the part 8 of the loop between the parts 6 and 7, is of a width at least equal to the diameter of the bottle neck, just below the top 9, but whose width is less than the outside diameter of the top of the bottle.

In applying the device to the bottle, special reference being made to Fig. 2, the device is moved in the direction of arrow $a$, with the part 6 foremost, and when the position of the article shown in full lines in this view is reached, the part 6 is moved upwardly and the part 7 downwardly; and as the movement of the device is continued, the part 7 engages the bottle neck just below the top or bead 9, while the part 6 occupies a position above the top and at sufficient distance therefrom to allow a person to use the part 6 as a handle in carrying the bottle.

Attention is called to the fact that the part 7 of the device extends somewhat more than half way around the neck of the bottle. This is important in order that the device may be operative, in view of the fact that the space between the members of the part 8 is less than the outside diameter of the top of the bottle. Since these members must extend upwardly from the part 7 above the top of the bottle, and this they could not do in the absence of the aforesaid condition relating to the part 7.

I claim:

1. A milk bottle carrier, comprising a closed loop, larger at one end than the other, the two ends being bent toward each other, the opening in the larger end being of sufficient size to allow the top of a milk bottle to pass through while the opening in the smaller end is too contracted for such passage, but large enough to receive the neck of the bottle just below the top, the opening in the part between the bent ends being also large enough to receive the neck just below the top, but of less width than the outside diameter of the top.

2. A substantially rigid milk bottle carrier, comprising a loop having one end adapted to receive and engage the neck of the bottle just below the top bead, the opening of said end being too narrow to permit passage of the bead, the other end of said loop being bent toward the first mentioned end to approach parallelism therewith and the opening of said other end being sufficiently wide to pass said bead, the portions of said loop connecting said ends being spaced and presenting therebetween on one side of the carrier an open throat wide enough to pass the bottle neck but too narrow to pass said top bead.

3. A substantially rigid milk bottle carrier, comprising a wire loop having a part adapted to engage the neck of the bottle just below the top bead and extend around the same somewhat more than half way, parts extending upwardly from the extremities of the first named part on both sides of the bottle and above the top thereof and merging into a handle member located directly above the diametral center of the bottle, the said handle part having an opening at least equal in width to the outside diameter of the top of the bottle and the said upwardly extending parts providing a throat therebetween adapted to receive the neck of the bottle and being too close together to permit passage of said top bead.

In testimony whereof I affix my signature.

WILLIAM CHESTER CAMPBELL.